United States Patent
Tremblay et al.

(10) Patent No.: US 7,058,877 B2
(45) Date of Patent: Jun. 6, 2006

(54) METHOD AND APPARATUS FOR PROVIDING ERROR CORRECTION WITHIN A REGISTER FILE OF A CPU

(75) Inventors: Marc Tremblay, Menlo Park, CA (US); Shailender Chaudhry, San Francisco, CA (US); Quinn A. Jacobson, Sunnyvale, CA (US)

(73) Assignee: SUN Microsystems, Inc., Santa Clara, CA (US)

( * ) Notice: Subject to any disclaimer, the term of this patent is extended or adjusted under 35 U.S.C. 154(b) by 478 days.

(21) Appl. No.: 10/146,100

(22) Filed: May 14, 2002

(65) Prior Publication Data

US 2003/0217325 A1    Nov. 20, 2003

(51) Int. Cl.
*H03M 13/03*    (2006.01)

(52) U.S. Cl. .................. 714/792; 714/758; 714/763
(58) Field of Classification Search ............. 714/763, 714/17, 6, 758, 746, 769, 792; 360/49; 711/112; 708/530

See application file for complete search history.

(56) References Cited

U.S. PATENT DOCUMENTS

| | | | | |
|---|---|---|---|---|
| 4,471,456 A | * | 9/1984 | Branigin et al. ............ 710/100 |
| 4,682,281 A | * | 7/1987 | Woffinden et al. .......... 711/207 |
| 4,701,915 A | | 10/1987 | Kitamura et al. ............. 371/13 |
| 5,604,753 A | | 2/1997 | Bauer et al. ............... 371/40.1 |
| 5,640,286 A | * | 6/1997 | Acosta et al. ................ 360/48 |
| 5,661,848 A | * | 8/1997 | Bonke et al. ............... 711/112 |
| 5,689,727 A | * | 11/1997 | Bonke et al. ................ 710/20 |
| 5,691,994 A | * | 11/1997 | Acosta et al. .............. 714/784 |
| 5,966,530 A | * | 10/1999 | Shen et al. ................. 712/244 |
| 6,301,221 B1 | * | 10/2001 | Paterson ..................... 370/208 |

* cited by examiner

*Primary Examiner*—Albert Decady
*Assistant Examiner*—Mujtaba Chaudry
(74) *Attorney, Agent, or Firm*—Park, Vaughan & Fleming LLP

(57) ABSTRACT

A system that facilitates error correction within a register file in a central processing unit (CPU). During execution of an instruction by the CPU, the system retrieves a dataword and an associated syndrome from a source register in the register file. Next, the system uses information in the dataword and the associated syndrome to detect, and if necessary correct, an error in the dataword or associated syndrome. This error detection and correction takes place in parallel with using the dataword to perform a computational operation specified by the instruction. If an error is detected, the system prevents the instruction from performing a writeback to a destination register in the register file. The system also writes a corrected dataword to the source register in the register file. Next, the system flushes the instruction pipeline, and restarts execution of the instruction so that the corrected dataword is retrieved for the computational operation.

16 Claims, 4 Drawing Sheets

METHOD AND APPARATUS FOR PROVIDING ERROR CORRECTION WITHIN A REGISTER FILE OF A CPU

BACKGROUND

1. Field of the Invention

The present invention relates to providing fault-tolerance within computer systems. More specifically, the present invention relates to a method and an apparatus for providing error correction within a register file of a central processing unit (CPU).

2. Related Art

Rapid advances in semiconductor technology presently make it possible to incorporate large register files onto a microprocessor chip. These large register files can be used to improve microprocessor performance. For example, the technique of vertical multi-threading relies on the replication of thread state, such as register files, to improve microprocessor performance. Hence, a four-way vertical multi-threaded processor requires four copies of the register file for efficient operation.

Unfortunately, large on-chip register files are susceptible to random bit errors. For example, assume each processor has four sets of register files, and each register file has 128 registers that are eight bytes in size. This means each processor contains 4×128×8=4K bytes of register file memory. If there are eight processors on a chip, this means each chip contains 32K bytes of register file memory that is susceptible to random bit errors.

One solution to this problem is to use error-correcting codes to detect and correct these errors. Semiconductor memories located outside a microprocessor chip often include additional space for storing a syndrome for each dataword. When a dataword is first stored into memory, a syndrome is calculated from the dataword, and this syndrome is stored along with the dataword in the memory. The dataword and the syndrome collectively form a codeword in the error-correcting code. When the dataword is subsequently retrieved from the memory, the syndrome is also retrieved. At the same time, a new syndrome is calculated for the retrieved data word. If the new syndrome differs from the retrieved syndrome, a bit error has occurred in either the dataword or the syndrome. In this case, information from the syndrome and the dataword is used to correct the bit error. Note that simply maintaining parity bits does not suffice to correct errors in a register file because there exists no backup copy of data within the register file that can be used to correct the error.

One problem with using conventional techniques to incorporate error-correcting codes into a register file is that extra time is required to perform the computational operations involved in detecting and correcting errors. This added delay, caused by longer cycle times or additional pipeline stages, can seriously degrade system performance because the register file is located on a main critical path in the computer system.

Hence, what is needed is a method and an apparatus for fixing bit errors in an on-chip register file without significantly degrading system performance.

SUMMARY

One embodiment of the present invention provides a system that facilitates error correction within a register file in a central processing unit (CPU). During execution of an instruction by the CPU, the system retrieves a dataword and an associated syndrome from a source register in the register file. Next, the system uses information in the dataword and the associated syndrome to detect, and if necessary correct, an error in the dataword or associated syndrome. Note that this error detection and correction takes place in parallel with using the dataword to perform a computational operation specified by the instruction. If an error is detected, the system prevents the instruction from performing a writeback to a destination register in the register file. The system also writes a corrected dataword to the source register in the register file. Next, the system flushes the instruction pipeline, and restarts execution of the instruction so that the corrected dataword is retrieved for the computational operation.

In a variation on this embodiment, the system generates a syndrome for data to be written to the destination register. Next, the system writes the syndrome along with the data to the destination register in the register file.

In a further variation, generation of the syndrome takes place concurrently with other operations in the instruction pipeline so that no additional pipeline stage is required to generate the syndrome.

In a further variation, the register file includes a plurality of write ports. In this variation, generating the syndrome involves generating a syndrome for each write port to receive data. Furthermore, writing the syndrome to the register file involves writing a syndrome to each write port to receive data.

In a variation on this embodiment, the register file includes a plurality of read ports. In this variation, retrieving the dataword and the associated syndrome involves retrieving a plurality of datawords and associated syndromes from the register file in parallel. Furthermore, the system performs error correction and detection in parallel for the plurality of datawords and associated syndromes.

In a variation on this embodiment, the operations of flushing the instruction pipeline and restarting the instruction take place during a micro-trap instruction that does not return control to the operating system.

In a variation on this embodiment, writing the corrected dataword to the source register involves steering an index for the source register to a write port of the register file.

In a variation on this embodiment, writing the corrected dataword to the source register involves steering the corrected dataword to a write port of the register file.

DETAILED DESCRIPTION

The following description is presented to enable any person skilled in the art to make and use the invention, and is provided in the context of a particular application and its requirements. Various modifications to the disclosed embodiments will be readily apparent to those skilled in the art, and the general principles defined herein may be applied to other embodiments and applications without departing from the spirit and scope of the present invention. Thus, the present invention is not limited to the embodiments shown, but is to be accorded the widest scope consistent with the principles and features disclosed herein.

Multiprocessor System

Figure 1:
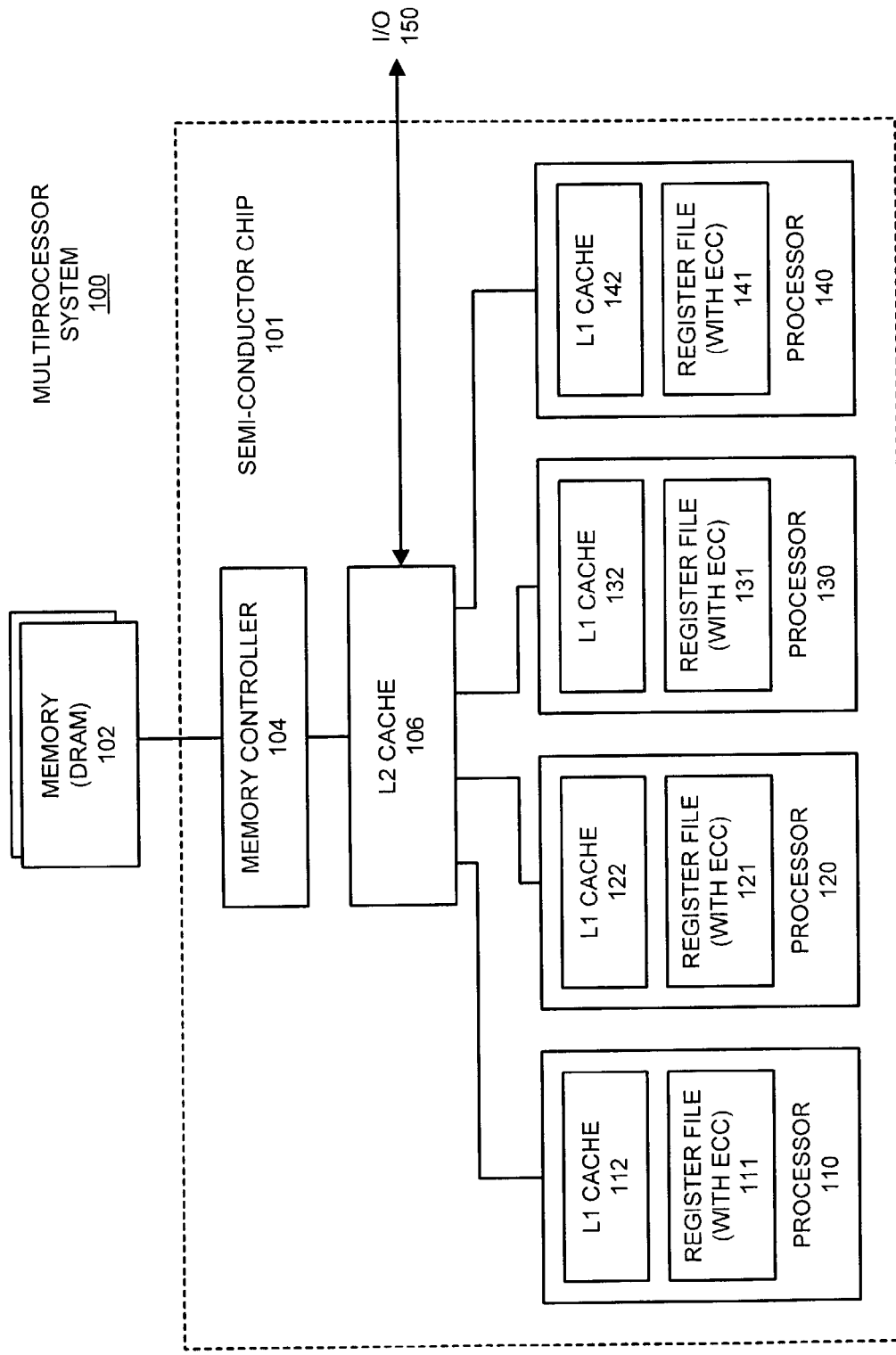
FIG. 1 illustrates a multiprocessor system in accordance with an embodiment of the present invention.

FIG. 1 illustrates a multiprocessor system 100 in accordance with an embodiment of the present invention. Note much of multiprocessor system 100 is located within a single semiconductor chip 101. More specifically, semiconductor chip 101 includes a number of processors 110, 120, 130 and 140, which contain level-one (L1) caches 112, 122, 132 and 142, respectively. L1 caches 112, 122, 132 and 142 are coupled to level-two (L2) cache 106, which is coupled to off-chip memory 102 through memory controller 104 and has input/output (I/O) 150.

Processors 110, 120, 130 and 140 also contain register files 111, 121, 131 and 141, respectively. These register files 111, 121, 131 and 141 make use of error correcting codes as is described in more detail below with reference to FIGS. 2–4.

Although the present invention is described in the context a multiprocessor system 100 with two levels of caches, the present invention can generally be applied to any type of central processing unit that includes a register file, and is not meant to be limited to the specific multiprocessor system 100 illustrated in FIG. 1. For example, the present invention can also be applied to a uni-processor system.

Register File and ECC Circuitry

Figure 2:
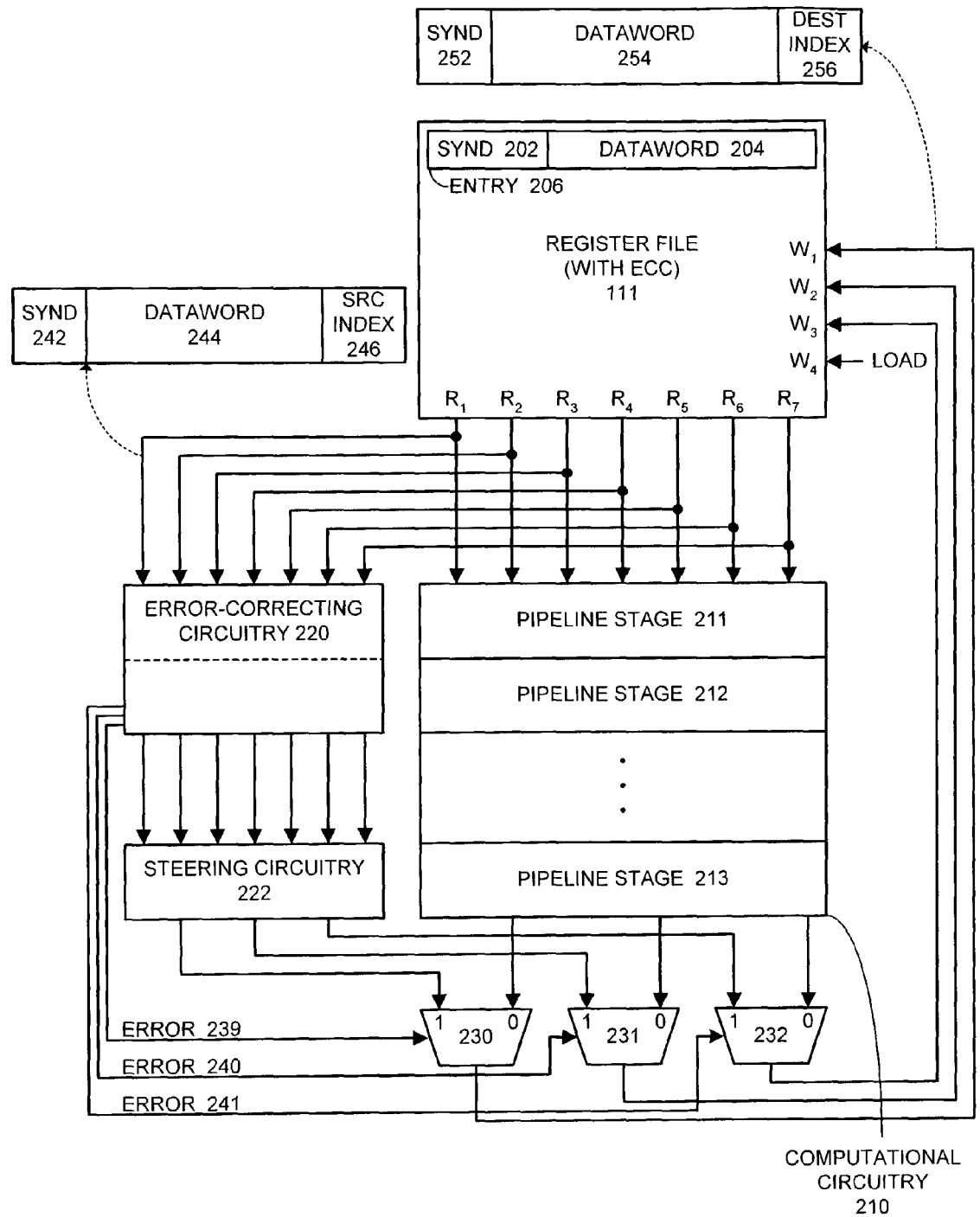
FIG. 2 illustrates a register file along with associated computational and error-correcting circuitry in accordance with an embodiment of the present invention.

FIG. 2 illustrates a register file 111 with associated computational circuitry 210 and error-correcting circuitry 220 in accordance with an embodiment of the present invention. Register file 111 includes a number of entries that can be accessed through register indices. A given entry 206 includes a dataword 204, along with an associated syndrome 202, which is computed from dataword 204. Dataword 204 and syndrome 202 collectively comprise a codeword in an error correcting code. In general, the present invention can use any error-correcting code that makes use of a syndrome. For example, one embodiment of the present invention uses a Reed-Solomon error-correcting code. Furthermore, syndrome 202 and dataword 204 can alternatively be stored in separate register files.

Register file 111 includes seven read ports R1–R7. This allows register file 111 to perform three computational operations in parallel. For example, a first operation can add the outputs of ports R1 and R2, while a second operation performs a bit-wise ANDing operation between the outputs of words R3 and R4. At the same time, the outputs of R5 and R6 can be used to compute an address, which is used to store a data item from the output of R7.

Register file 111 also includes four write ports W1–W4. This allows results from three computational operations to be simultaneously written to register file 111 through write ports W1–W3, while a concurrent load operation writes data into register file 111 through write port W4.

Note that register file 111 can generally include any type of register file within a CPU and is not meant to be limited to the specific register file illustrated in FIG. 2.

The outputs of read ports R1–R7 feed through a conventional set of pipeline stages 211–213 that perform computational operations. The output of the last pipeline stage 213 feeds into the write ports W1–W3 of register file 111 to store results of the computational operations.

The circuitry illustrated in FIG. 2 additionally includes error correcting circuitry 220 that is not found in conventional processor designs. More specifically, the outputs of read ports R1–R7 feed into error correcting circuitry 220. Each of these outputs includes a syndrome 242, an associated dataword 244 and a register source index 246. Source index 246 indicates which register syndrome 242 and dataword 244 originated from.

Error-correcting circuitry 220 includes well-known circuitry for detecting and correcting errors based on a syndrome 242 and an associated dataword 244. During operation, error-correcting circuitry 220 generates corrected datawords and syndromes, which feed into steering circuitry 222. If one or more errors occur, steering circuitry 222 steers up to three corrected dataword/syndrome pairs to write ports W1–W3. This allows up the three dataword/syndrome pairs to be corrected at the same time. If there are more than three errors, the system waits to correct the additional errors until the same instruction is executed again. Note that a simpler embodiment of the invention only corrects one error at a time.

Note that source index 246 also propagates through error-correction circuitry 220 and steering circuitry along with syndrome 242 and dataword 244. Source index is used to write corrected dataword/syndrome pairs back into register file 111.

Also note that error correcting circuitry 220 and steering circuitry 222 are pipelined, and the that length of the pipeline formed by error-correcting circuitry 220 and steering circuitry 222 matches the length of the execution pipeline formed by pipeline stages 211–213.

Error correcting circuitry 220 also generates error signals 239–241, which are selectively asserted if one or more errors are detected in outputs R1–R7 of register file 111. Error signals 239–241 feed into multiplexers 230–232, respectively. If an error is detected, error signals 239–141 cause selected outputs of steering circuitry 222 that carry corrected data to feed into write ports W1–W3. This allows corrected data to be written to register file 111. Otherwise, write ports W1–W3 receive the results of computational operations from pipeline stage 213.

Note that each one of write ports W1–W4 receives a syndrome 252, an associated dataword 254 and a register destination index 256. Register destination index 256 normally specifies the destination register for an instruction. However, during an error condition, destination index 256 may contain an index for a source register that has propagated through error-correcting circuitry 220 and steering circuitry 222. This source register index is used to correct an erroneous dataword/syndrome pair retrieved from the register file 111.

Also note that in addition to the circuitry illustrated in FIG. 2, the present invention also includes circuitry to generate syndrome 252 during a normal write operation to register file 111. In one embodiment of the present invention, syndrome 252 is computed in the last stage 213 of the instruction pipeline. In another embodiment, syndrome 252 is computed in a preceding pipeline stage as soon as the data is available, so that no additional pipeline stage is required. Furthermore, the input to write port W4 also similarly feeds through syndrome generation circuitry.

Error Correction Process

Figure 3:
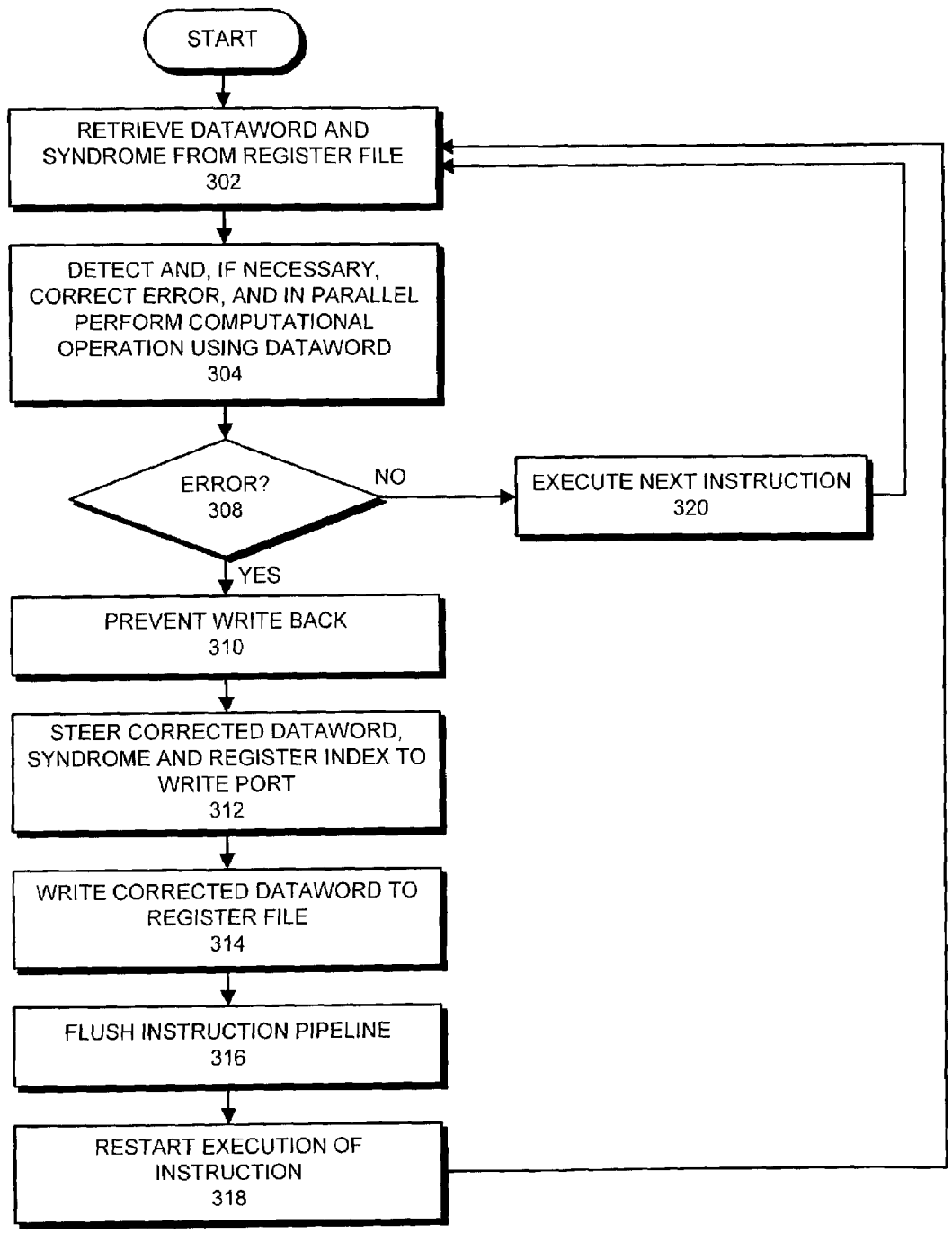
FIG. 3 is a flow chart illustrating the error correction process in accordance with an embodiment of the present invention.

FIG. 3 is a flow chart illustrating the error correction process in accordance with an embodiment of the present invention. The system starts by using source index 246 to retrieve a dataword 244 and an associated syndrome 242 from register file 111 (step 302). Next, error-correcting circuitry 220 detects, and if necessary corrects, an error in dataword 244 or syndrome 242 using well-known error correction techniques. In parallel with this error correction, the system can perform a computational operation using dataword 244 (step 304).

If no error is detected by error correcting circuitry 220, the system simply begins executing the next instruction (step 320). This involves returning to step 302 to retrieve a subsequent dataword.

Otherwise, if an error is detected, the system prevents the instruction that generated the error from performing a writeback to register file 111 (step 310). The system also steers the corrected dataword 244 and syndrome 242 along with source index 246 to one of write ports W1–W3 through steering circuitry 222 (step 312). Next, the system writes the corrected dataword to the register file through the selected write port (step 314).

The system also performs a micro-trap operation, which flushes the instruction pipeline (step 316) and restarts execution of the instruction that caused the error (step 318). This is accomplished without returning control to the operating system.

Restarting execution of the instruction involves returning to step 302 to retrieve the corrected dataword/syndrome pair from the location specified by source index 246.

Note that a store operation does not actually generate a result, the data to be stored simply flows down the pipeline. If there is an error in this data it can be overwritten with corrected data before it is written out to memory.

Generating a Syndrome

Figure 4:
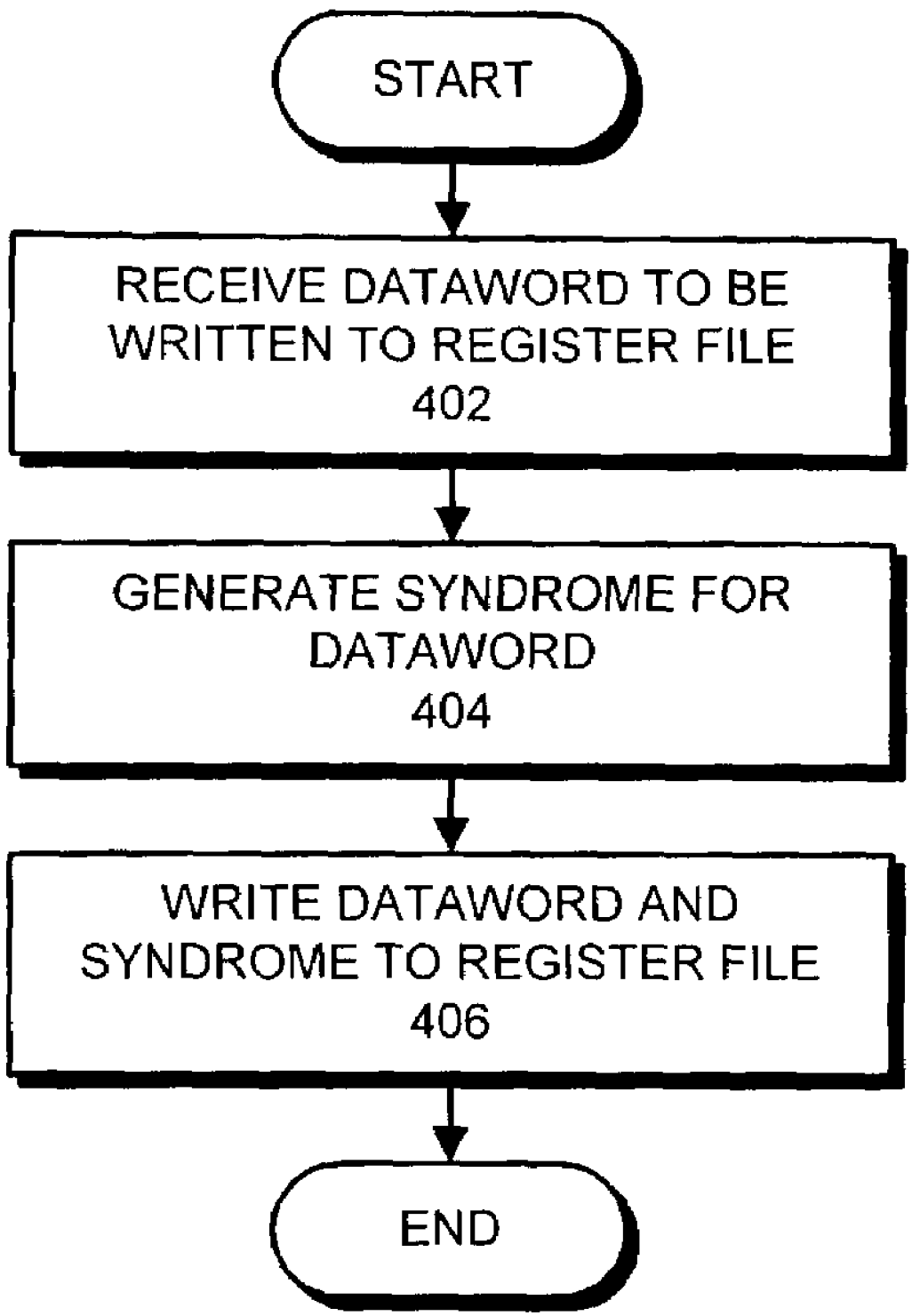
FIG. 4 is a flow chart illustrating the process of generating a syndrome in accordance with an embodiment of the present invention.

FIG. 4 is a flow chart illustrating the process of generating a syndrome in accordance with an embodiment of the present invention. The system starts by receiving a dataword 254 to be written to register file 111 (step 402). Next, the system generates a syndrome 252 for the dataword (step 404). Next, the system uses a destination index 256 to write dataword 254 and syndrome 252 to memory (step 406).

The foregoing descriptions of embodiments of the present invention have been presented only for purposes of illustration and description. They are not intended to be exhaustive or to limit the present invention to the forms disclosed. Accordingly, many modifications and variations will be apparent to practitioners skilled in the art. Additionally, the above disclosure is not intended to limit the present invention. The scope of the present invention is defined by the appended claims.

What is claimed is:

1. A method for providing error correction within a register file of a central processing unit, comprising:
    retrieving a dataword and an associated syndrome from a source register in the register file during execution of an instruction;
    using information in the dataword and the associated syndrome to detect, and if necessary correct, an error in the dataword or the associated syndrome;
    wherein the error detection and correction takes place while the central processing unit uses the dataword to perform a computational operation specified by an instruction of the central processing unit, and wherein performing the computational operation while the error detection and correction is being performed allows the computational operation to proceed without waiting for the error detection and correction to complete; and
    if an error is detected,
        preventing the instruction from performing a writeback to a destination register in the register file,
        writing a corrected dataword to the source register in the register file,
        flushing the instruction pipeline, and
        restarting execution of the instruction so that the corrected dataword is retrieved for the computational operation.

2. The method of claim 1, further comprising:
    generating a syndrome for write data to be written to the destination register in the register file; and
    writing the syndrome and the write data to the destination register in the register file.

3. The method of claim 2, wherein generation of the syndrome takes place concurrently with other operations in the instruction pipeline so that no additional pipeline stage is required to generate the syndrome.

4. The method of claim 1,
    wherein the register file includes a plurality of read ports;
    wherein retrieving the dataword and the associated syndrome involves retrieving a plurality of datawords and associated syndromes from the register file in parallel; and
    wherein error correction and detection takes place in parallel for the plurality of datawords and associated syndromes.

5. The method of claim 2,
    wherein the register file includes a plurality of write ports;
    wherein generating the syndrome involves generating a syndrome for each write port to receive data;
    wherein writing the syndrome to the register file involves writing a syndrome to each write port to receive data.

6. The method of claim 1, wherein the operations of flushing the instruction pipeline and restarting the instruction take place during a micro-trap instruction that does not return control to the operating system.

7. The method of claim 1, wherein writing the corrected dataword to the source register involves steering an index for the source register to a write port of the register file.

8. The method of claim 1, wherein writing the corrected dataword to the source register involves steering the corrected dataword to a write port of the register file.

9. An apparatus that provides error correction for a register file within a central processing unit, comprising:
   a retrieval mechanism that is configured to retrieve a dataword and an associated syndrome from a source register in the register file during execution of an instruction;
   an error detection and correction circuit that is configured to use information in the dataword and the associated syndrome to detect, and if necessary correct, an error in the dataword or the associated syndrome;
   wherein the error detection and correction circuit operates while a functional unit uses the dataword to perform a computational operation within the central processing unit specified by an instruction of the central processing unit, and wherein performing a computational operation while the error detection and correction is being performed allows the computational operation to proceed without waiting for the error detection and correction to complete;
   a writeback mechanism for the register file, wherein if an error is detected, the writeback mechanism is configured to,
      prevent the instruction from performing a writeback to a destination register in the register file, and to
      write a corrected dataword to the source register in the register file; and
   a restart mechanism, wherein if an error is detected, the restart mechanism is configured to,
      flush the instruction pipeline, and to
      restart execution of the instruction so that the corrected dataword is retrieved for the computational operation.

10. The apparatus of claim 9, further comprising a syndrome generation circuit that is configured to generate a syndrome for write data to be written to the destination register in the register file;
   wherein the writeback mechanism is configured to write the syndrome and the write data to the destination register in the register file.

11. The apparatus of claim 10, wherein the syndrome generation circuit is configured to generate the syndrome concurrently with other operations in the instruction pipeline so that no additional pipeline stage is required to generate the syndrome.

12. The apparatus of claim 9,
   wherein the register file includes a plurality of read ports;
   wherein the retrieval mechanism is configured to retrieve a plurality of datawords and associated syndromes from the register file in parallel; and
   wherein error detection and correction circuit is configured to detect and corrects errors for the plurality of datawords and associated syndromes in parallel.

13. The apparatus of claim 10,
   wherein the register file includes a plurality of write ports;
   wherein the syndrome generation circuit is configured to generate a syndrome for each write port to receive data;
   wherein the writeback mechanism is configured to write a syndrome to each write port to receive data.

14. The apparatus of claim 9, wherein the restart mechanism flushes the instruction pipeline and restarts the instruction during a micro-trap operation that does not return control to the operating system.

15. The apparatus of claim 9, wherein the writeback mechanism includes circuitry to steer an index for the source register to a write port of the register file.

16. The apparatus of claim 9, wherein the writeback mechanism includes circuitry to steer the corrected dataword to a write port of the register file.

* * * * *